United States Patent
Yoneyama

(10) Patent No.: US 12,318,942 B2
(45) Date of Patent: Jun. 3, 2025

(54) ROBOT PROGRAMMING DEVICE AND ROBOT PROGRAMMING METHOD

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 282 days.

(21) Appl. No.: 18/028,626

(22) PCT Filed: Oct. 15, 2021

(86) PCT No.: PCT/JP2021/038255
§ 371 (c)(1),
(2) Date: Mar. 27, 2023

(87) PCT Pub. No.: WO2022/085587
PCT Pub. Date: Apr. 28, 2022

(65) Prior Publication Data
US 2023/0330856 A1   Oct. 19, 2023

(30) Foreign Application Priority Data

Oct. 22, 2020   (JP) .................................. 2020-177169

(51) Int. Cl.
*B25J 9/16*   (2006.01)
(52) U.S. Cl.
CPC ........... *B25J 9/1664* (2013.01); *B25J 9/1671* (2013.01)
(58) Field of Classification Search
CPC ................. B25J 9/1664; B25J 9/1671; G05B 2219/40515; G05B 2219/45058; Y02P 90/02
See application file for complete search history.

(56) References Cited

U.S. PATENT DOCUMENTS

2014/0143991 A1   5/2014   Windprechtinger et al.
2016/0151913 A1*  6/2016   Nagatsuka ............ B25J 9/1664
                                              700/254
(Continued)

FOREIGN PATENT DOCUMENTS

CN       109976259         7/2019
DE    10 2015 015 093      6/2016
(Continued)

OTHER PUBLICATIONS

International Search Report issued Dec. 28, 2021, in International (PCT) Application No. PCT/JP2021/038255, with English translation.

*Primary Examiner* — Adam R Mott
*Assistant Examiner* — Sagar Kc
(74) *Attorney, Agent, or Firm* — Wenderoth, Lind & Ponack, L.L.P.

(57) ABSTRACT

This robot programming device creates an operational program for a robot that moves while pressing a gripped object, which is gripped by the robot, against a fixed object. The robot programming device includes a model arrangement unit which arranges, in a three-dimensional virtual space, a robot model of the robot, a gripped object model of the gripped object, and a fixed object model of the fixed object, a reference line designation unit which designates a reference line indicating a range, of the outer circumference of the gripped object model, to be pressed against the fixed object, a transfer start point designation unit which designates a transfer start point for transferring the reference line onto the fixed object model, and an operational path creation unit which creates an operational path by transferring the reference line onto the fixed object by using the transfer start point as the start point.

4 Claims, 11 Drawing Sheets

(56) References Cited

U.S. PATENT DOCUMENTS

2016/0354933 A1* 12/2016 Sato .................. B25J 9/1633
2023/0004140 A1* 1/2023 Yasukochi ......... G05B 19/4097

FOREIGN PATENT DOCUMENTS

| DE | 10 2013 008 755 | 6/2018 |
| DE | 10 2020 110 492 | 10/2020 |
| JP | 06-047688 | 2/1994 |
| JP | 09-091027 | 4/1997 |
| JP | 09-244722 | 9/1997 |
| JP | 2000-190195 | 7/2000 |
| JP | 2016-002627 | 1/2016 |
| JP | 2017-001122 | 1/2017 |
| JP | 2020-19126 | 2/2020 |
| JP | 2020-037154 | 3/2020 |

* cited by examiner

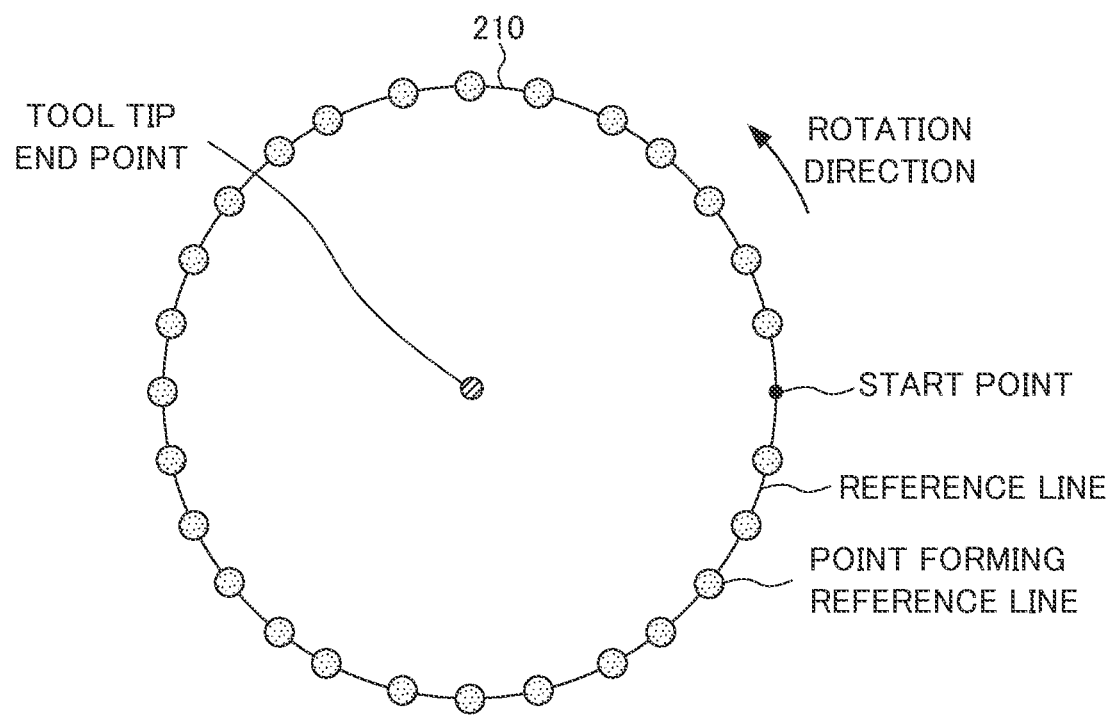

ROBOT PROGRAMMING DEVICE AND ROBOT PROGRAMMING METHOD

TECHNICAL FIELD

The present invention relates to a robot programming device and a robot programming method.

BACKGROUND ART

A technique has been known, in which three-dimensional models of a robot equipped with a tool, a workpiece, and at least one peripheral are simultaneously arranged and displayed on a screen, a machining line is specified on the three-dimensional model of the workpiece, operation mode, speed, position, and posture are specified for a teaching point generated based on the specified machining line, and a robot operation program for machining the workpiece is generated based on the specified machining line and the specified operation mode, speed, position, and posture. For example, see Patent Document 1.

Patent Document 1: Japanese Unexamined Patent Application, Publication No. 2016-0002627

DISCLOSURE OF THE INVENTION

Problems to be Solved by the Invention

For example, in order to create, e.g., an operation program for pressing a roller gripped by a robot against a plane block to bond a pattern (e.g., a seal) on the roller to the plane block or an operation program for pressing a workpiece gripped by a robot against a belt sander to polish the workpiece, it is difficult for the above-described prior art to create an operation program for operating the robot in a state in which the roller gripped by the robot is constantly pressed against the plane block or the workpiece gripped by the robot is constantly pressed against the belt sander.

For example, in teaching, a worker needs to move, in the field, the roller gripped by the robot such that the roller contacts the plane block or move the workpiece gripped by the robot such that the workpiece contacts the belt sander to manually perform a teaching process while checking these movement steps one by one. For this reason, a great number of steps are required for the teaching process.

Thus, there has been a demand for easily creating a robot operation program for moving a gripping object gripped by a robot with the gripping object pressed against a fixed object.

Means for Solving the Problems

One aspect of the robot programming device of the present disclosure is a robot programming device for creating a robot operation program for moving a gripping object gripped by a robot with the gripping object pressed against a fixed object, the robot programming device including a model arrangement unit configured to arrange, in a three-dimensional virtual space, a robot model of the robot, a gripping object model of the gripping object, and a fixed object model of the fixed object, a reference line designation unit configured to specify a reference line indicating an area of the outer periphery of the gripping object model to be pressed against the fixed object, a transfer start point designation unit configured to specify a transfer start point of transfer of the reference line on the fixed object model, and an operation path creation unit configured to transfer, start-ing from the transfer start point, the reference line onto the fixed object to create an operation path.

One aspect of the robot programming method of the present disclosure is a robot programming method for creating a robot operation program, which is implemented by a computer, for moving a gripping object gripped by a robot with the gripping object pressed against a fixed object, the robot programming method including arranging, in a three-dimensional virtual space, a robot model of the robot, a gripping object model of the gripping object, and a fixed object model of the fixed object, specifying a reference line indicating an area of the outer periphery of the gripping object model to be pressed against the fixed object, specifying a transfer start point of transfer of the reference line on the fixed object model, and transferring, starting from the transfer start point, the reference line onto the fixed object to create an operation path.

Effects of the Invention

According to one aspect, the robot operation program for moving the gripping object gripped by the robot with the gripping object pressed against the fixed object can be easily created.

BRIEF DESCRIPTION OF THE DRAWINGS

FIG. 3B is a view showing one example of the reference line;

PREFERRED MODE FOR CARRYING OUT THE INVENTION

First Embodiment

A configuration of the present embodiment will be described in detail with reference to the drawings. A case will be described herein as an example, in which in a workspace, a robot grips a roller and presses the gripped roller against a plane block which is a plane plate-shaped workpiece to bond, e.g., a seal on the roller to the plane block. Note that the present invention is also applicable to a case where a robot grips a workpiece and presses the gripped workpiece against a belt sander to machine the workpiece, as described later.

Figure 1:
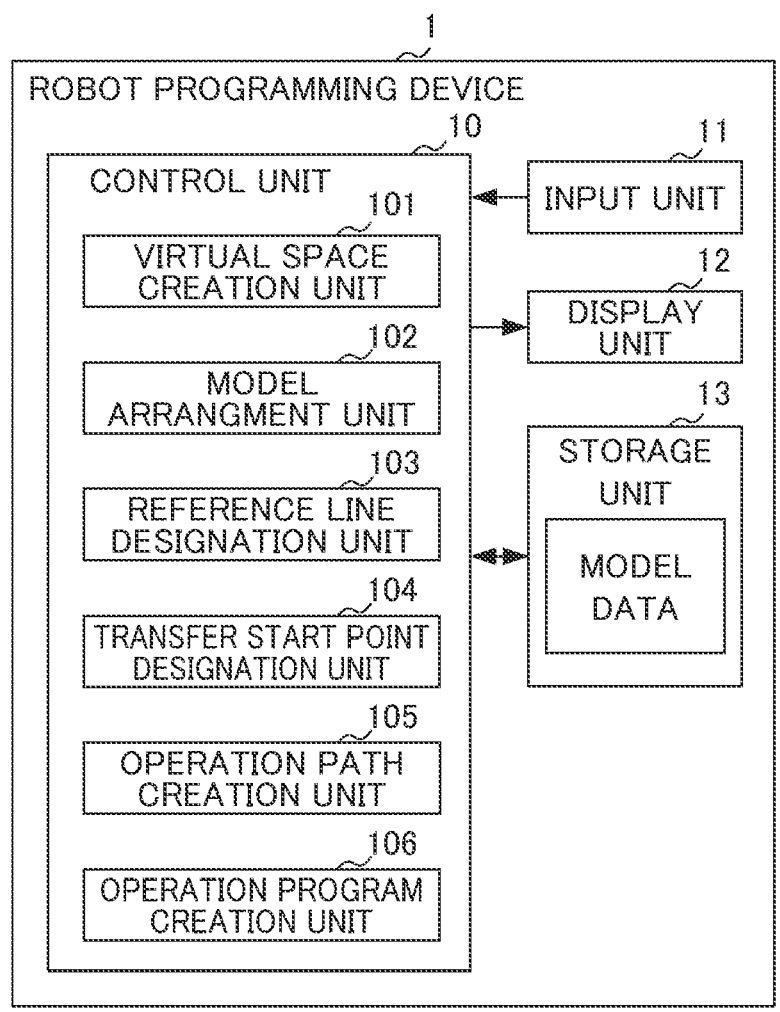
FIG. 1 is a functional block diagram showing a functional configuration example of a robot programming device according to a first embodiment.

FIG. 1 is a functional block diagram showing a functional configuration example of a robot programming device according to a first embodiment.

As shown in FIG. 1, the robot programming device 1 is a well-known computer, and includes a control unit 10, an input unit 11, a display unit 12, and a storage unit 13. The control unit 10 includes a virtual space creation unit 101, a model arrangement unit 102, a reference line specifier 103, a transfer start point specifier 104, an operation path creation unit 105, and an operation program creation unit 106. The storage unit 13 stores model data 131.

Note that the robot programming device 1 may be mutually connected to a robot control device (not shown) that controls operation of the robot (not shown) via a network such as a local area network (LAN) or the Internet. Alternatively, the robot programming device 1 may be directly connected to the robot control device (not shown) via a not-shown connection interface.

<Input Unit 11>

The input unit 11 is, e.g., a keyboard or a touch panel arranged on the later-described display unit 12, and receives input from a worker.

<Display Unit 12>

The display unit 12 is, e.g., a liquid crystal display. As described later, the display unit 12 displays, e.g., 3D CAD data, which is input (selected) by the worker via the input unit 11, on the robot (not shown), a gripping object such as a roller or a workpiece to be gripped by the robot, and a fixed object such as a plane block or a belt sander against which the gripping object is to be pressed.

<Storage Unit 13>

The storage unit 13 is, e.g., an SSD (solid state drive) or a HDD (hard disk drive), and may store the model data 131 together with various control programs.

As described above, the model data 131 is input (selected) by the worker via the input unit 11, and includes, e.g., the 3D CAD data, which is to be displayed on the display unit 12, on the robot (not shown), the gripping object such as the roller to be gripped by the robot, and the fixed object such as the plane block against which the gripping object is to be pressed.

<Control Unit 10>

The control unit 10 is a unit having, e.g., a CPU (central processing unit), a ROM (read only memory), a RAM (random access memory), and a CMOS (complementary metal-oxide-semiconductor) memory, these components being mutually communicable with each other via a bus and the unit being well-known by those skilled in the art.

The CPU is a processor that controls the robot programming device 1 in an integrated manner. The CPU reads a system program and an application program stored in the ROM via the bus, and controls the entirety of the robot programming device 1 according to the system program and the application program. With this configuration, the control unit 10 implements the functions of the virtual space creation unit 101, the model arrangement unit 102, the reference line specifier 103, the transfer start point specifier 104, the operation path creation unit 105, and the operation program creation unit 106, as shown in FIG. 1. The RAM stores various types of data such as temporary calculation data and display data. The CMOS memory is backed up by a not-shown battery, and is configured as a non-volatile memory that holds a storage state even if the robot programming device 1 is powered off.

The virtual space creation unit 101 creates a virtual space that is a three-dimensional representation of the workspace in which the robot (not shown), the roller as the gripping object, and the plane block as the fixed object are arranged.

The model arrangement unit 102 arranges, in the three-dimensional virtual space created by the virtual space creation unit 101, the 3D CAD data on the robot (not shown) (hereinafter also referred to as a "robot model"), the 3D CAD data on the roller (the gripping object) (hereinafter also referred to as a "gripping object model"), and the 3D CAD data on the plane block (the fixed object) (hereinafter also referred to as a "fixed object model").

Specifically, in order to arrange the not-shown model, the roller, and the plane block in the virtual space, the model arrangement unit 102 reads the robot model of the robot, the gripping object model of the roller, and the fixed object model of the plane block from the model data 131 in the storage unit 13. The model arrangement unit 102 arranges the read robot model of the robot, the read gripping object model of the roller, and the read fixed object model of the plane block, and displays these models on the display unit 12.

Figure 2:
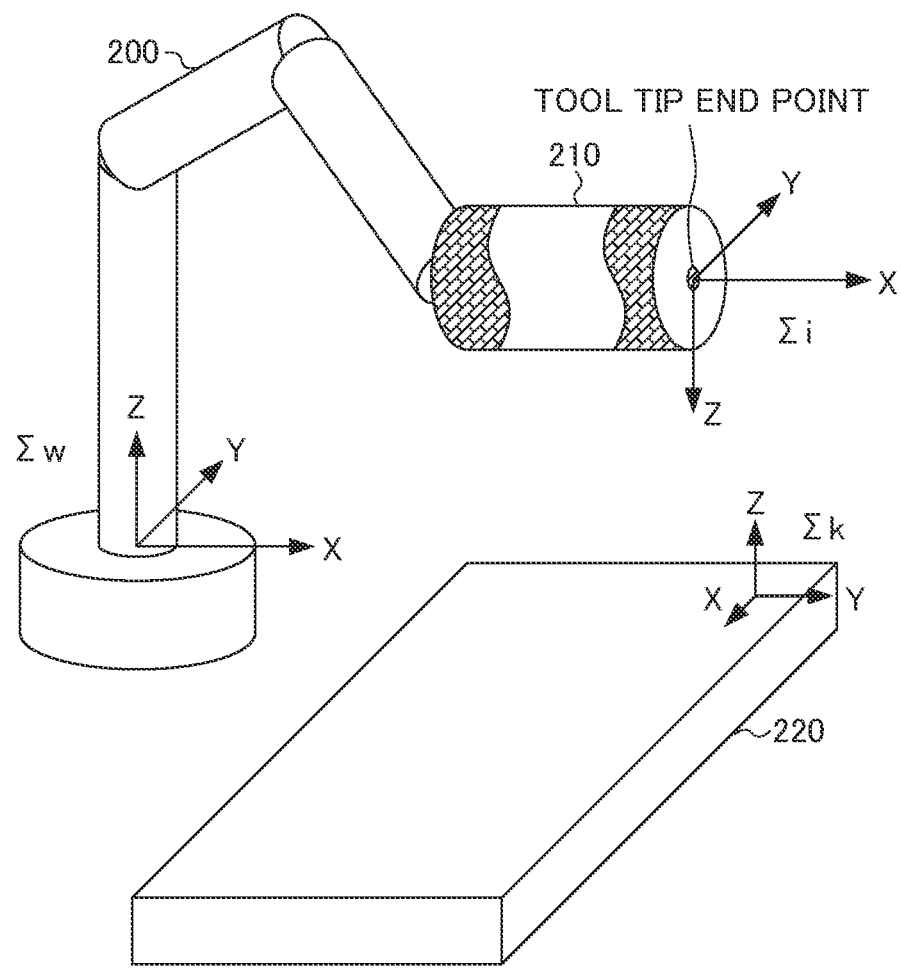
FIG. 2 is a view showing one example of a screen of a display unit on which a virtual space is displayed.

FIG. 2 is a view showing one example of a screen of the display unit 12 on which the virtual space is displayed.

As shown in FIG. 2, the robot model 200, the gripping object model 210, and the fixed object model 220 are arranged on the screen for the virtual space. For example, the seal to be bonded to the fixed object model 220 is placed on a cylindrical portion of the roller which is the gripping object model 210.

Note that in the virtual space, the robot model 200 has, as in the workspace, a world coordinate system $\Sigma w$ of a three-dimensional orthogonal coordinate system fixed on the space and a mechanical interface coordinate system $\Sigma i$ of a three-dimensional orthogonal coordinate system set to a tool tip end point of the gripping object model 210 gripped with a hand (not shown) attached to a tip end of an articulated shaft of the robot model 200. For the fixed object model 220, a fixed object coordinate system $\Sigma k$ is set, for example. In the present embodiment, the positions of the world coordinate system $\Sigma w$, the mechanical interface coordinate system $\Sigma i$, and the fixed object coordinate system $\Sigma k$ are correlated with each other in advance by well-known calibration. With this configuration, the later-described operation program creation unit 106 can create, using a position defined according to the world coordinate system $\Sigma w$, an operation program for controlling the position of a tip end portion of the robot model 200 to which the gripping object model 210 is attached, such as the position of the tool tip end point of the gripping object model 210.

The reference line specifier 103 specifies a reference line indicating an area, which is to be pressed against the plane block as the fixed object, of the outer periphery of the gripping object model 210 based on input operation by the worker via the input unit 11.

Figure 3A:
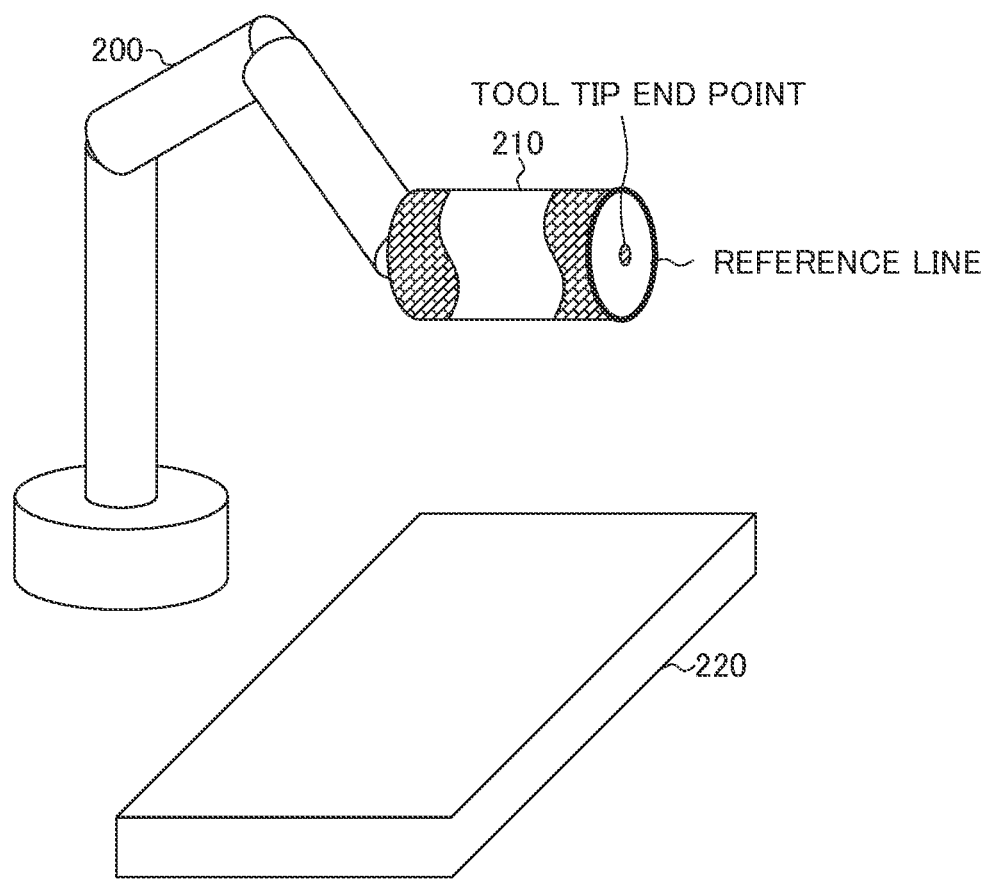
FIG. 3A is a view showing one example of a reference line specified by a reference line specifier.

FIG. 3A is a view showing one example of the reference line specified by the reference line specifier 103.

As shown in FIG. 3A, the reference line may be displayed as a highlighted thick line. Note that the reference line may be displayed as a highlighted line other than the thick line or be displayed as a highlighted line in a color such as red. As shown in FIG. 3B, the reference line is a cluster of a plurality of points.

FIG. 3B is a view showing one example of the reference line.

As shown in FIG. 3B, in a case where the gripping object model 210 such as the roller is, e.g., in a cylindrical shape and the reference line extends around the outer periphery of the gripping object model 210, the reference line specifier 103 may specify, based on the input operation by the worker via the input unit 11, a start point of bonding of, e.g., the seal on the gripping object model 210 to a surface of the fixed object model 220.

The transfer start point specifier 104 specifies a transfer start point of transfer of the reference line on the fixed object model 220.

Specifically, based on the input operation by the user via the input unit 11, the transfer start point specifier 104 specifies a point on the fixed object model 220, such as the origin of the coordinate system Σk of the fixed object model 220 of FIG. 2, as the transfer start point, and specifies an X-axis direction as the direction of transfer of each point of the reference line.

The operation path creation unit 105 transfers, starting from the transfer start point specified by the transfer start point specifier 104, the reference line onto the fixed object model 220, thereby creating an operation path.

Figure 4:
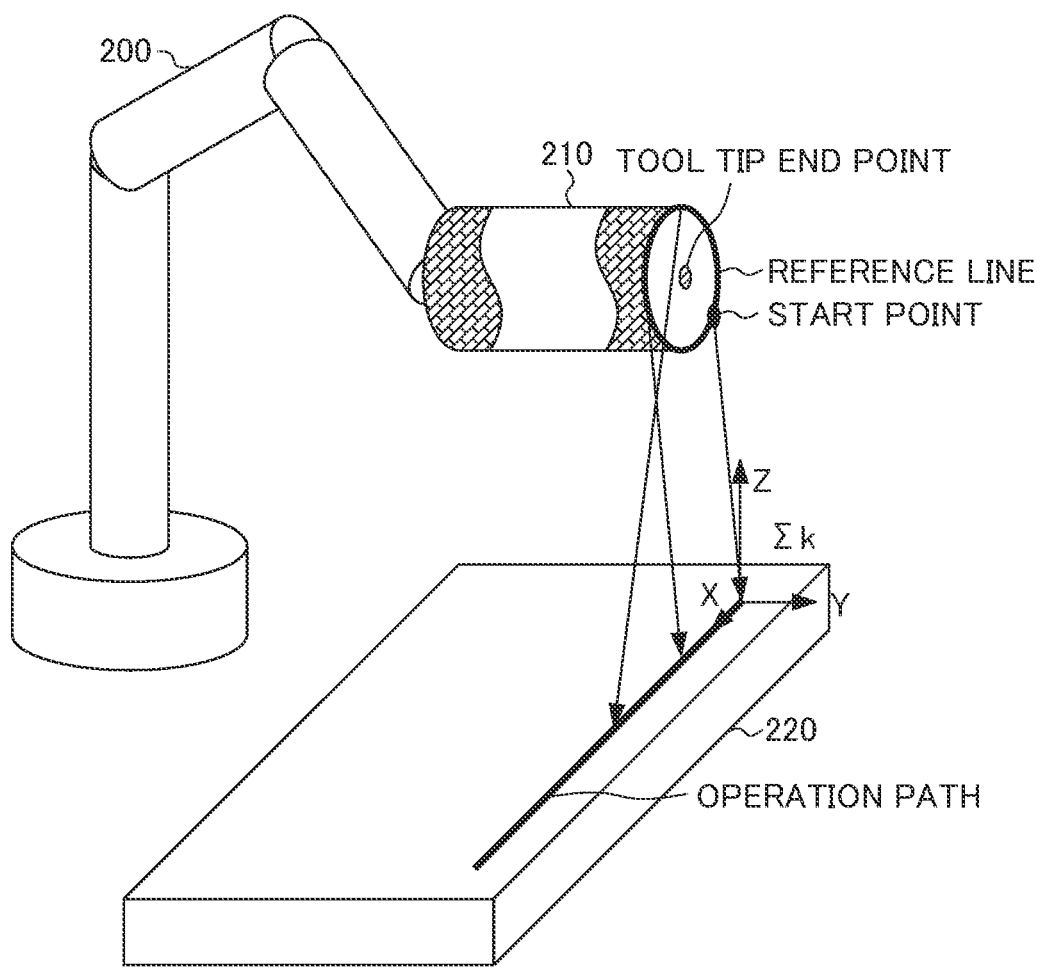
FIG. 4 is a view showing one example of a relationship between the reference line and an operation path.

Specifically, as shown in FIG. 4, the operation path creation unit 105 transfers, starting from a state in which the transfer start point and the start point of the reference line are coincident with each other, the reference line onto the surface of the fixed object model 220 along the X-axis direction while maintaining a distance between adjacent ones of the points forming the reference line. In this manner, the operation path creation unit 105 creates the operation path.

FIGS. 5A to 5D are views showing one example for describing operation of the operation path creation unit 105.

Figure 5A:
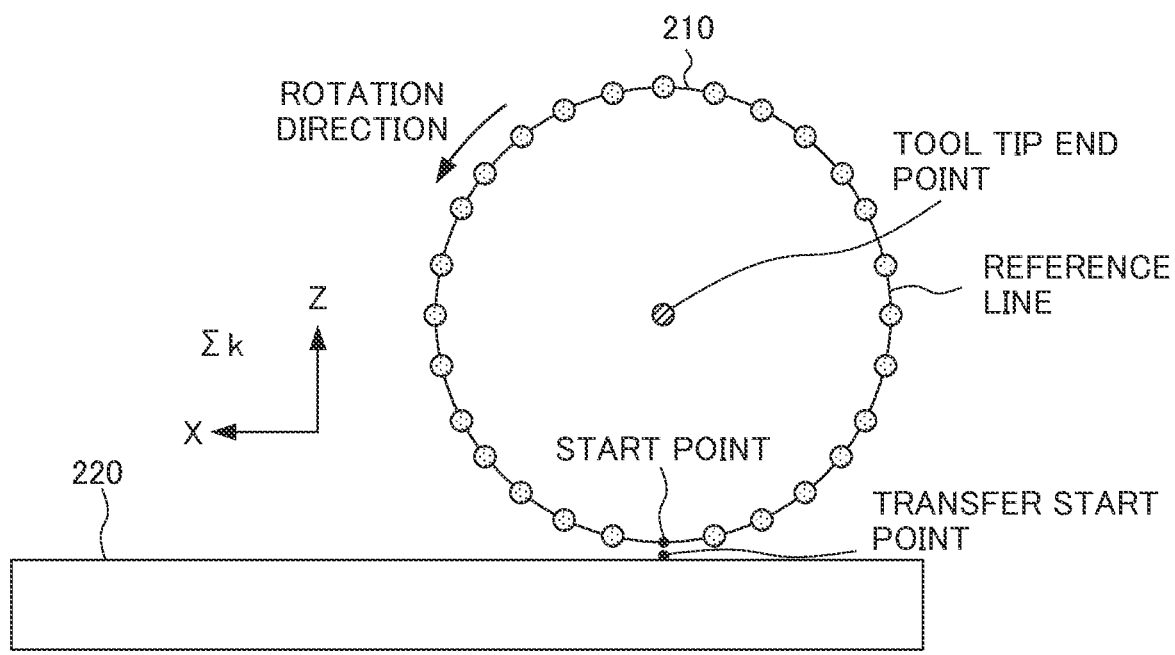
FIG. 5A is a view showing one example for describing operation of an operation path creation unit.
Figure 5B:
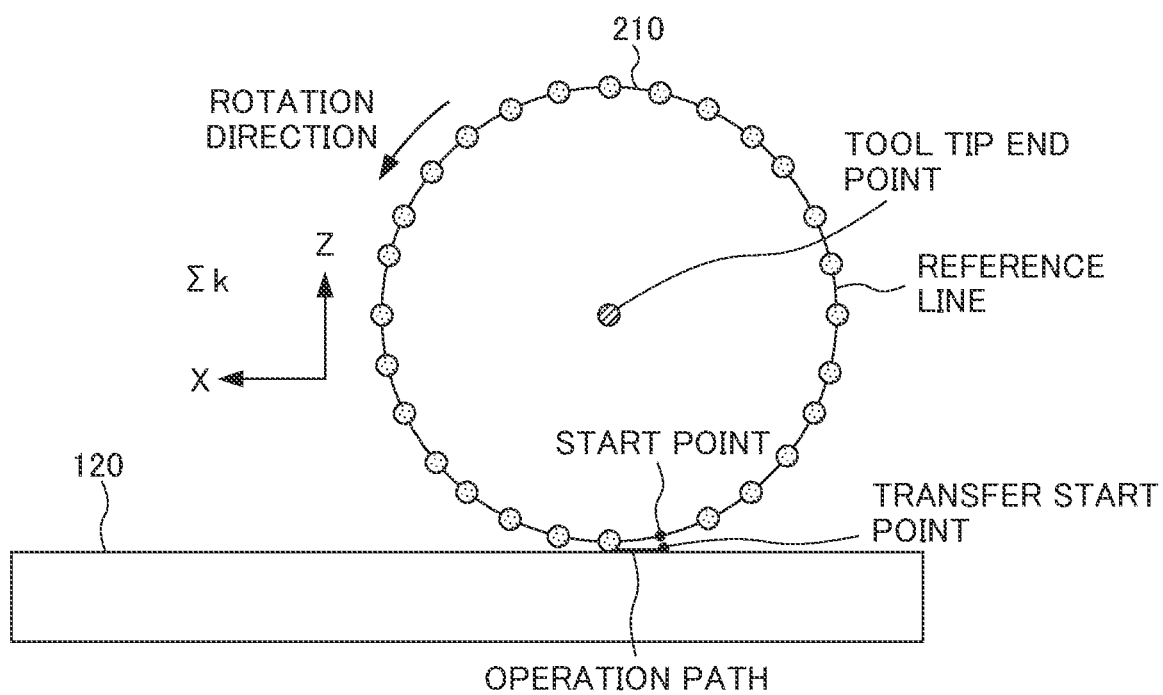
FIG. 5B is a view showing one example for describing operation of the operation path creation unit.
Figure 5C:
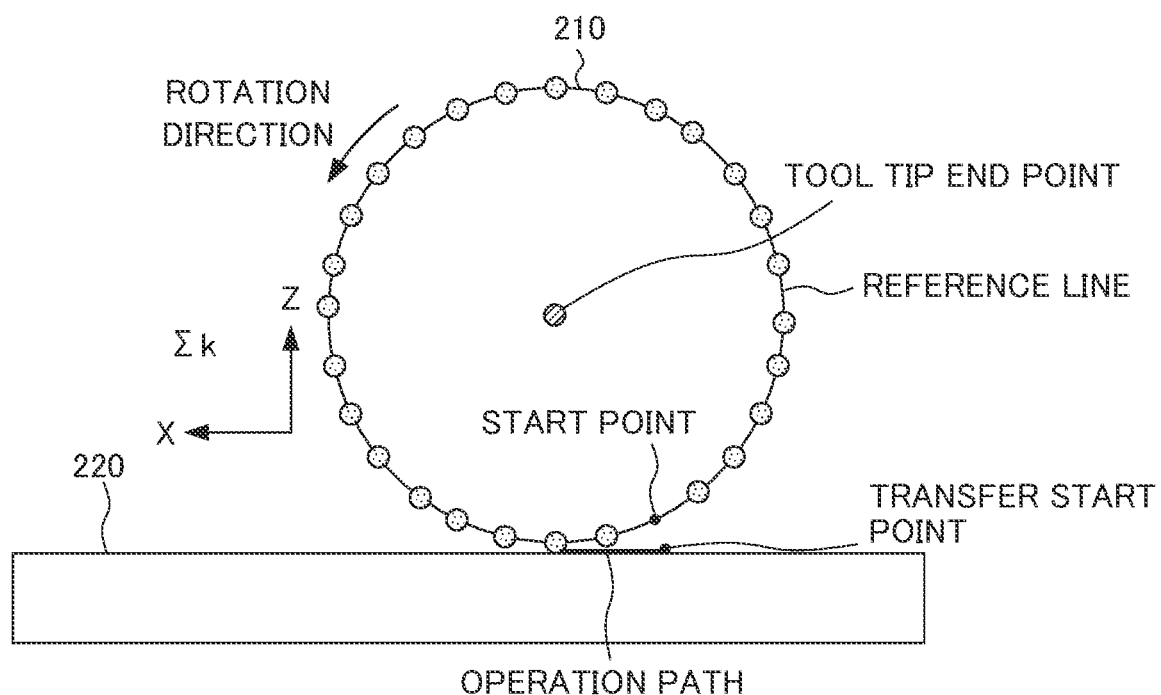
FIG. 5C is a view showing one example for describing operation of the operation path creation unit.
Figure 5D:
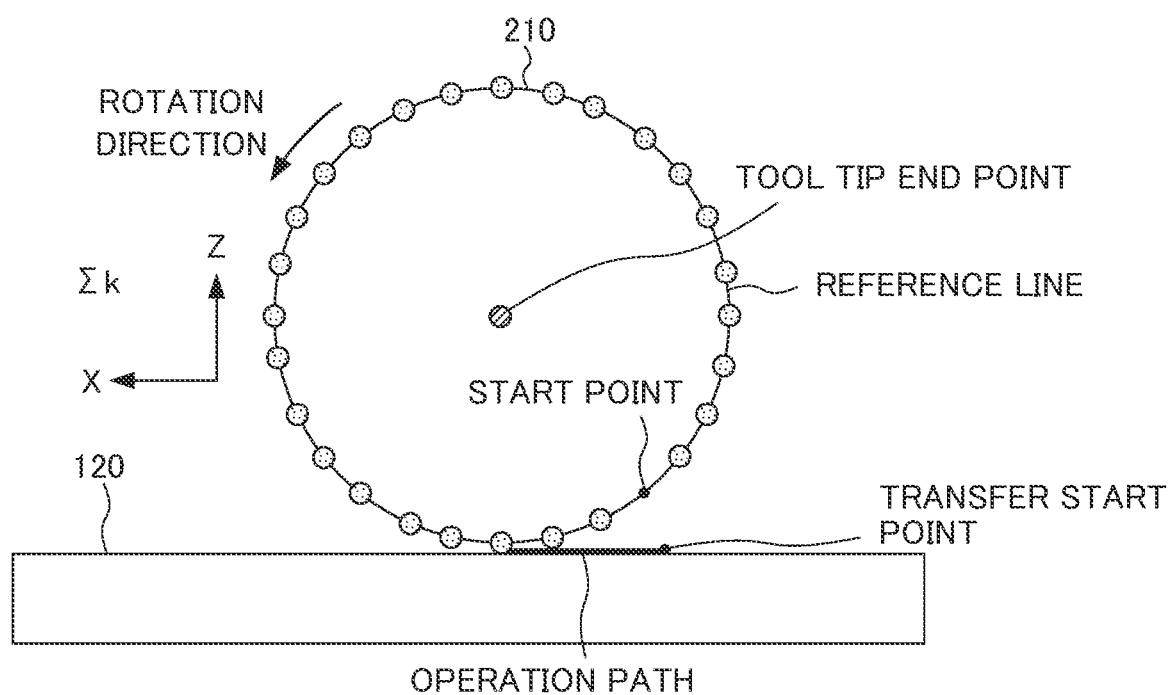
FIG. 5D is a view showing one example for describing operation of the operation path creation unit.

As shown in FIG. 5A, the operation path creation unit 105 causes the transfer start point on the surface of the fixed object model 220 and the start point of the reference line to be coincident with each other. As shown in FIGS. 5B to 5D, the operation path creation unit 105 transfers, one by one, the points forming the reference line onto the surface of the fixed object model 220 sequentially from the start point of the reference line while rotating the gripping object model 210. Note that as shown in FIGS. 5B to 5D, the operation path creation unit 105 performs, in a case where the reference line is a curved line, line approximation for the points forming the reference line, and projects the points forming the reference line while maintaining the distance between adjacent ones of these points. The operation path creation unit 105 transfers all points of the reference line as shown in FIGS. 5B to 5D, thereby creating the operation path on the surface of the fixed object model 220 along the X-axis direction as shown in FIG. 4.

The operation program creation unit 106 creates a robot operation program for moving the gripping object with the gripping object pressed against the fixed object based on the reference line specified by the reference line specifier 103 and the operation path created by the operation path creation unit 105.

Specifically, the operation program creation unit 106 obtains a teaching position (the position of the tool tip end point as viewed from the robot) of the robot operation program by multiplying the position of each point transferred onto the operation path as viewed from the robot model 200 by the position of the tool tip end point of the robot as viewed from each point forming the reference line, for example.

Figure 6A:
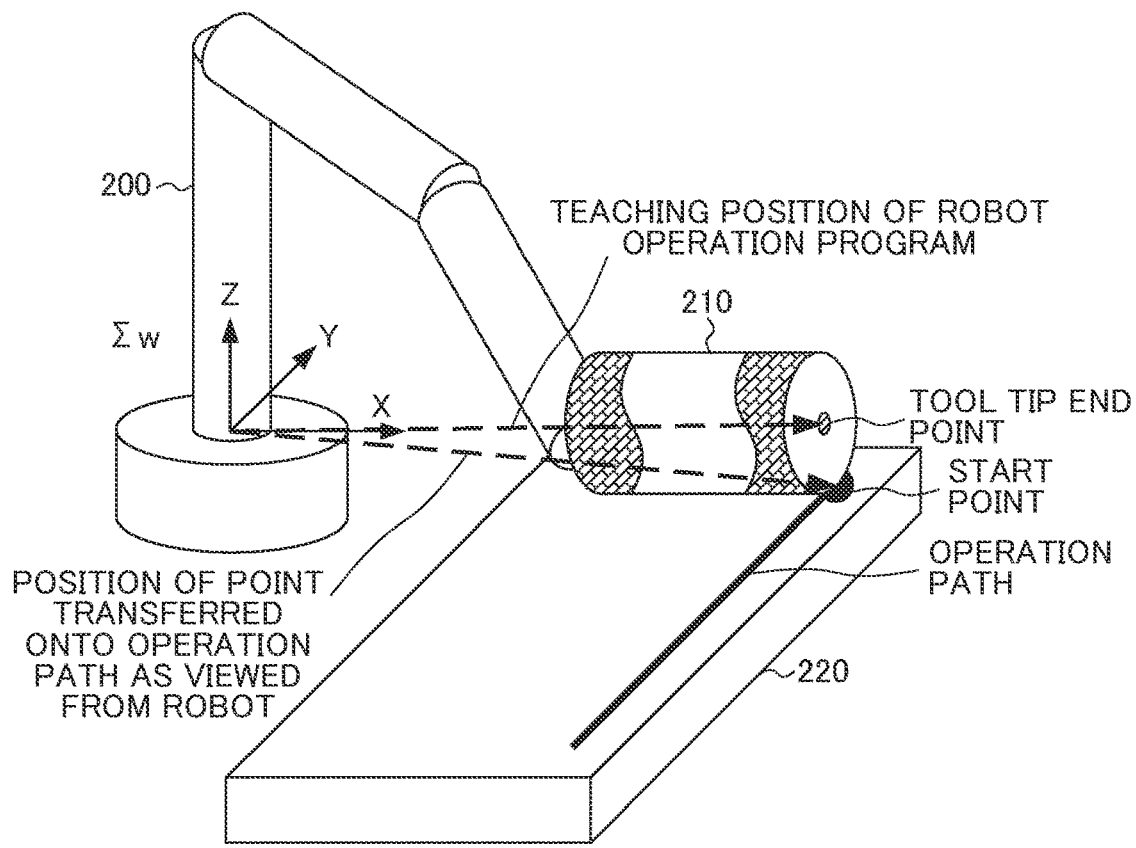
FIG. 6A is a view showing one example for describing a relationship between a teaching position of a robot operation program and the position of each point transferred onto an operation path as viewed from a robot.
Figure 6B:
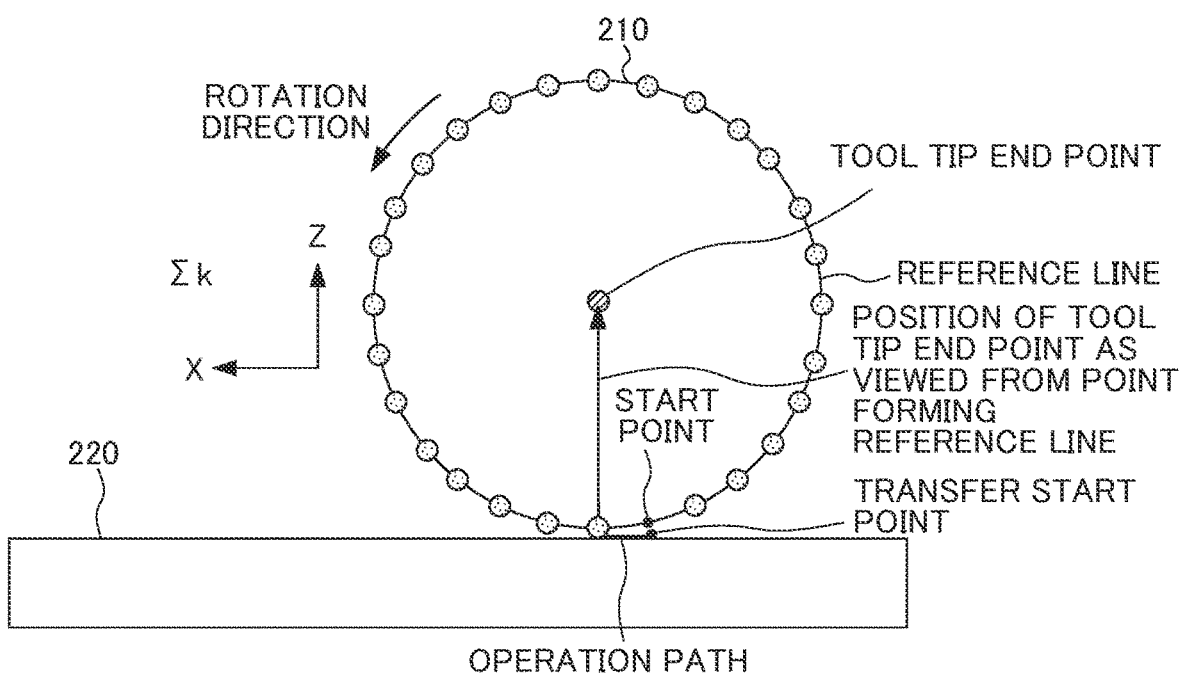
FIG. 6B is a view showing one example for describing the position of a tool tip end point of the robot as viewed from each point forming the reference line.

FIG. 6A is a view showing one example for describing a relationship between the teaching position of the robot operation program and the position of each point transferred onto the operation path as viewed from the robot. FIG. 6B is a view showing one example for describing the position of the tool tip end point of the robot as viewed from each point forming the reference line.

The operation program creation unit 106 obtains, for all points on the operation path, the teaching position (the position of the tool tip end point as viewed from the robot) of the robot operation program. The operation program creation unit 106 creates, based on the obtained teaching position, an operation program for moving the robot (not shown) with the roller pressed against the plane block to bond, e.g., the seal on the roller to the plane block. The operation program creation unit 106 may store the created operation program in the storage unit 13, or output the created operation program to the robot control device (not shown).

Figure 7:
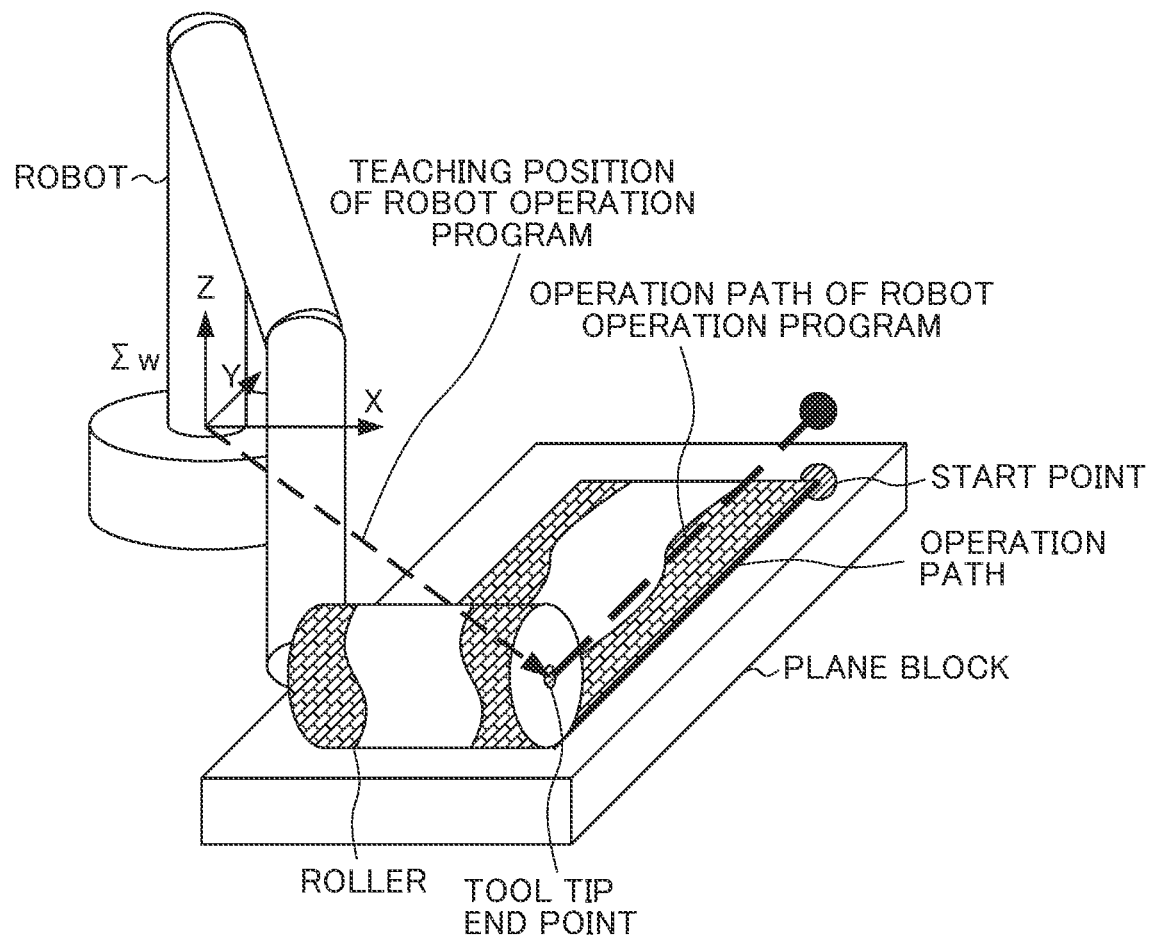
FIG. 7 is a view showing one example of a robot operation path based on the created operation program.

FIG. 7 is a view showing one example of a robot operation path based on the created operation program.

As shown in FIG. 7, the teaching position (the position of the tool tip end point) of the robot operation program is on an operation path of the robot operation program.

<Operation Program Creation Processing of Robot Programming Device 1>

Next, the flow of operation program creation processing of the robot programming device 1 will be described with reference to FIG. 8.

Figure 8:
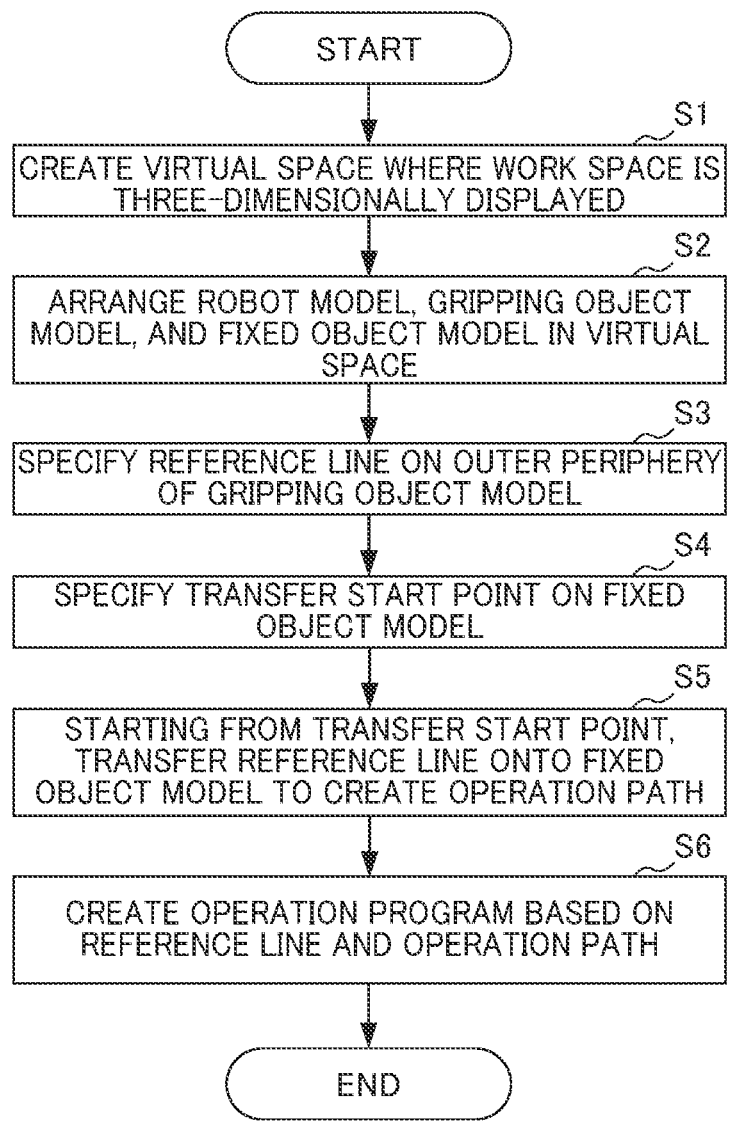
FIG. 8 is a flowchart for describing operation program creation processing of the robot programming device.

FIG. 8 is a flowchart for describing the operation program creation processing of the robot programming device 1. The flow described herein is executed every time the operation program is created.

In Step S1, the virtual space creation unit 101 creates the virtual space that is a three-dimension representation of the workspace in which the robot, the roller, and the plane block are arranged.

In Step S2, the model arrangement unit 102 arranges, in the three-dimensional virtual space created in Step S1, the robot model 200 of the robot, the gripping object model 210 of the roller, and the fixed object model 220 of the plane block.

In Step S3, the reference line specifier 103 specifies the reference line on the outer periphery of the gripping object model 210 based on the input operation by the user via the input unit 11.

In Step S4, the transfer start point specifier 104 specifies the transfer start point of transfer of the reference line on the fixed object model 220.

In Step S5, the operation path creation unit 105 transfers, starting from the transfer start point specified in Step S4, the reference line onto the fixed object model 220, thereby creating the operation path.

In Step S6, the operation program creation unit 106 creates, based on the reference line specified in Step S3 and the operation path created in Step S5, the robot operation program for moving the roller with the roller pressed against the plane block.

As described above, the robot programming device 1 according to the first embodiment arranges, in the virtual space, the robot model 200, the gripping object model 210, and the fixed object model 220. The robot programming device 1 specifies the reference line indicating the area of the gripping object model 210 to be pressed against the fixed object model 220 and the transfer start point of transfer of the reference line on the fixed object model 220, and starting from the transfer start point, transfers each point forming the reference line onto the fixed object model 220 to create the operation path. The robot programming device 1 creates, based on the reference line and the operation path, the robot operation program for moving the roller with the roller pressed against the plane block.

With this configuration, the robot programming device 1 can easily create the robot operation program for moving the gripping object gripped by the robot with the gripping object pressed against the fixed object, and accordingly, the number of steps necessary for a teaching process can be reduced.

The first embodiment has been described above.

Next, a second embodiment will be described. As described above, the robot programming device 1 according to the first embodiment creates the robot operation program in a case where in the workspace, the robot grips the roller and presses the gripped roller against the plane block to bond, e.g., the seal on the roller to the plane block. On the other hand, a robot programming device 1 according to the second embodiment is different from that of the first embodiment in that the robot programming device 1 creates a robot operation program in a case where in a workspace, a robot grips a workpiece and presses the gripped workpiece against a belt sander to machine the workpiece.

With this configuration, the robot programming device 1 according to the second embodiment can easily create the robot operation program for moving a gripping object gripped by the robot with the gripping object pressed against a fixed object.

Hereinafter, the second embodiment will be described.

The robot programming device 1 according to the second embodiment has elements similar to those of the robot programming device 1 of FIG. 1, and the same reference numerals are used to represent these elements and detailed description thereof will be omitted.

The robot programming device 1 includes a control unit 10, an input unit 11, a display unit 12, and a storage unit 13. The control unit 10 includes a virtual space creation unit 101, a model arrangement unit 102, a reference line specifier 103, a transfer start point specifier 104, an operation path creation unit 105, and an operation program creation unit 106. The storage unit 13 stores model data 131.

The control unit 10, the input unit 11, the display unit 12, and the storage unit 13 have functions similar to those of the control unit 10, the input unit 11, the display unit 12, and the storage unit 13 according to the first embodiment.

Moreover, the virtual space creation unit 101, the model arrangement unit 102, the reference line specifier 103, the transfer start point specifier 104, the operation path creation unit 105, and the operation program creation unit 106 have functions similar to those of the virtual space creation unit 101, the model arrangement unit 102, the reference line specifier 103, the transfer start point specifier 104, the operation path creation unit 105, and the operation program creation unit 106 according to the first embodiment.

Figure 9:
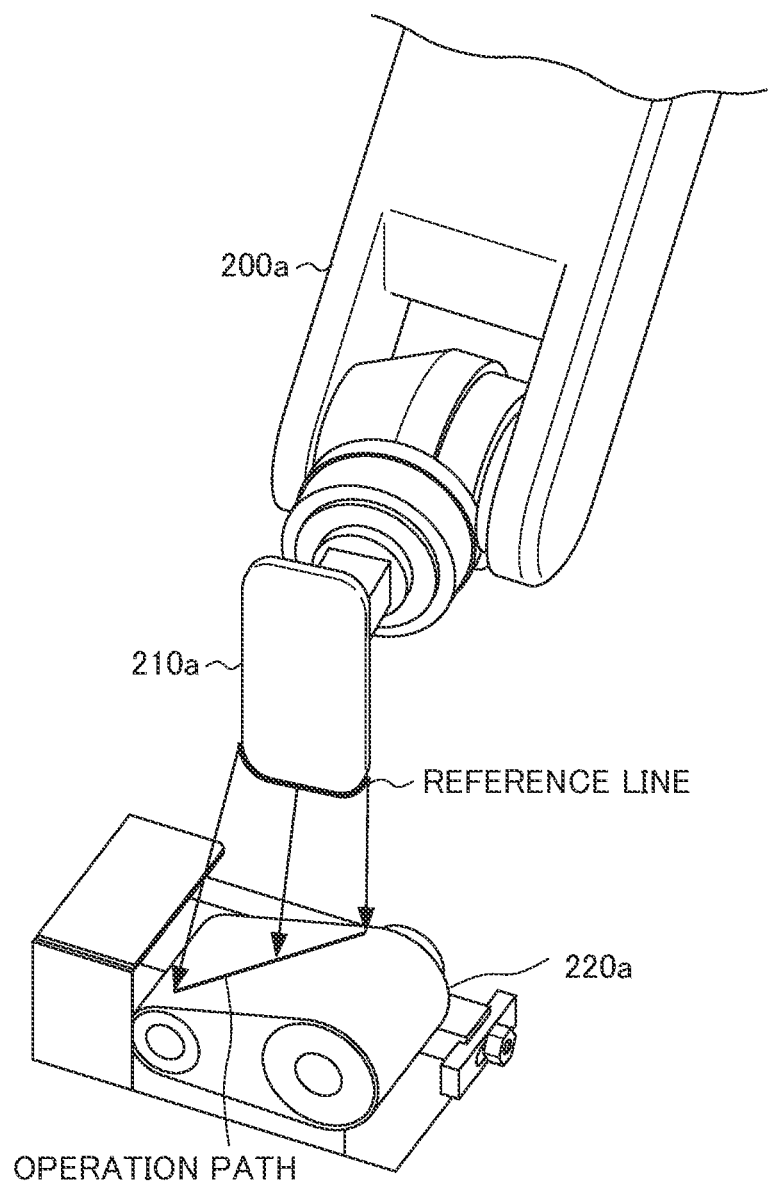
FIG. 9 is a view showing one example of the screen of the display unit on which the virtual space is displayed.

FIG. 9 is a view showing one example of a screen of the display unit 12 on which a virtual space is displayed. Note that FIG. 9 shows only part of an end of a hand of a robot model 200a.

As shown in FIG. 9, the model arrangement unit 102 arranges, in the virtual space, the robot model 200a, a gripping object model 210a of the workpiece to be machined, and a fixed object model 220a of the belt sander. Note that the workpiece as the gripping object model 210a in FIG. 9 has rounded corners, but may have an optional shape such as a rectangular parallelepiped shape.

Based on input operation by a user via the input unit 11, the reference line specifier 103 specifies, as a reference line, an area of the outer periphery of the gripping object model 210a indicated by a thick line, as shown in FIG. 9. Note that the reference line specifier 103 may specify one end point of the reference line as a start point based on the input operation by the user via the input unit 11.

The transfer start point specifier 104 specifies a transfer start point of transfer of the reference line on the fixed object model 220a.

As in the case of FIGS. 5A and 5B, the operation path creation unit 105 transfers, starting from the specified transfer start point, each point forming the reference line onto the fixed object model 220a, thereby creating an operation path.

The operation program creation unit 106 of the robot programming device 1 creates, based on the reference line specified by the reference line specifier 103 and the operation path created by the operation path creation unit 105, a robot operation program for moving the workpiece to be machined with the workpiece pressed against the belt sander.

Note that operation program creation processing of the robot programming device 1 is similar to that in the case of FIG. 8 and detailed description thereof will be omitted.

As described above, the robot programming device 1 according to the second embodiment arranges, in the virtual space, the robot model 200a, the gripping object model 210a, and the fixed object model 220a. The robot programming device 1 specifies the reference line indicating the area of the gripping object model 210a to be pressed against the fixed object model 220a and the transfer start point of transfer of the reference line on the fixed object model 220a, and starting from the transfer start point, transfers each point forming the reference line onto the fixed object model 220a to create the operation path. The robot programming device 1 creates, based on the reference line and the operation path, the robot operation program for moving the workpiece to be machined with the workpiece pressed against the belt sander.

With this configuration, the robot programming device 1 can easily create the robot operation program for moving the gripping object gripped by the robot with the gripping object pressed against the fixed object, and accordingly, the number of steps necessary for a teaching process can be reduced.

The second embodiment has been described above.

The first and second embodiments have been described above, but the robot programming device 1 is not limited to the above-described embodiments and changes, modifications, etc. can be made within a scope in which the object can be achieved.

<Variation>

In the above-described first and second embodiments, the robot programming device 1 is a device different from the robot control device (not shown), but the present disclosure is not limited to above. For example, the robot programming device 1 may be included in the robot control device (not shown).

Note that each function of the robot programming device 1 in the first and second embodiments can be implemented by hardware, software, or a combination thereof. Implementation by the software as described herein means implementation by reading and execution of a program by a computer.

The program can be stored using various types of non-transitory computer readable media and be supplied to the computer. The non-transitory computer readable media include various types of tangible storage media. Examples of the non-transitory computer readable media include magnetic recording media (e.g., a flexible disk, a magnetic tape, and a hard disk drive), magnetic optical recording media (e.g., a magnetic optical disk), a CD-read only memory (CD-ROM), a CD-R, a CD-R/W, and semiconductor memories (e.g., a mask ROM, a programmable ROM (PROM), an erasable PROM (EPROM), a flash ROM, and a RAM). The program may be supplied to the computer by means of various types of transitory computer readable media. Examples of the transitory computer readable media include an electric signal, an optical signal, and an electromagnetic wave. The transitory computer readable medium can supply the program to the computer via a wired communication path such as an electric wire or an optical fiber or a wireless communication path.

Note that the steps of describing the program recorded in the recording medium include not only processing performed in chronological order, but also processing executed in parallel or separately.

In other words, the robot programming device and the robot programming method of the present disclosure may include various embodiments having the following configurations.

(1) The robot programming device 1 of the present disclosure is a robot programming device for creating a robot operation program for moving a gripping object gripped by a robot with the gripping object pressed against a fixed object, the robot programming device including a model arrangement unit 102 configured to arrange, in a three-dimensional virtual space, a robot model 200, 200*a* of the robot, a gripping object model 210, 210*a* of the gripping object, and a fixed object model 220, 220*a* of the fixed object, a reference line designation unit 103 configured to specify a reference line indicating an area of the outer periphery of the gripping object model 210, 210*a* to be pressed against the fixed object, a transfer start point designation unit 104 configured to specify a transfer start point of transfer of the reference line on the fixed object model 220, 220*a*, and an operation path creation unit 105 configured to transfer, starting from the transfer start point, the reference line onto the fixed object to create an operation path.

According to the robot programming device 1, the robot operation program for moving the gripping object gripped by the robot with the gripping object pressed against the fixed object can be easily created.

(2) The robot programming device 1 according to (1) may further include an operation program creation unit 106 configured to create, based on the reference line and the operation path, the robot operation program for moving the gripping object with the gripping object pressed against the fixed object.

With this configuration, the robot programming device 1 can reduce the number of steps necessary for a teaching process.

(3) The robot programming method of the present disclosure is a robot programming method for creating a robot operation program, which is implemented by a computer, for moving a gripping object gripped by a robot with the gripping object pressed against a fixed object, the robot programming method including arranging, in a three-dimensional virtual space, a robot model 200, 200*a* of the robot, a gripping object model 210, 210*a* of the gripping object, and a fixed object model 220, 220*a* of the fixed object, specifying a reference line indicating an area of the outer periphery of the gripping object model 210, 210*a* to be pressed against the fixed object, specifying a transfer start point of transfer of the reference line on the fixed object model 220, 220*a*, and transferring, starting from the transfer start point, the reference line onto the fixed object to create an operation path.

According to the robot programming method, advantageous effects similar to those of (1) can be obtained.

(4) In the robot programming method according to (3), based on the reference line and the operation path, the robot operation program for moving the gripping object with the gripping object pressed against the fixed object may be created.

With this configuration, the robot programming method can produce advantageous effects similar to those of (2)

EXPLANATION OF REFERENCE NUMERALS

1 Robot Programming Device
10 Control Unit
101 Virtual Space Creation Unit
102 Model Arrangement Unit
103 Reference Line Designation Unit
104 Transfer Start Point Designation Unit
105 Operation Path Creation Unit
106 Operation Program Creation Unit
11 Input Unit
12 Display Unit
13 Storage Unit
131 Model Data

The invention claimed is:

1. A robot programming device for creating a robot operation program for moving a gripping object gripped by a robot with the gripping object pressed against a fixed object, comprising:
    a model arrangement unit configured to arrange, in a three-dimensional virtual space, a robot model of the robot, a gripping object model of the gripping object, and a fixed object model of the fixed object;
    a reference line designation unit configured to specify a reference line indicating an area of an outer periphery of the gripping object model to be pressed against the fixed object;
    a transfer start point designation unit configured to specify a transfer start point of transfer of the reference line on the fixed object model; and
    an operation path creation unit configured to transfer, starting from the transfer start point, the reference line onto the fixed object to create an operation path,
    wherein the robot is controlled by a robot controller according to the operation path.

2. The robot programming device according to claim 1, further comprising: an operation program creation unit configured to create, based on the reference line and the operation path, the robot operation program for moving the gripping object with the gripping object pressed against the fixed object.

3. A robot programming method for creating a robot operation program, which is implemented by a computer, for moving a gripping object gripped by a robot with the gripping object pressed against a fixed object, comprising:
    arranging, in a three-dimensional virtual space, a robot model of the robot, a gripping object model of the gripping object, and a fixed object model of the fixed object;
    specifying a reference line indicating an area of an outer periphery of the gripping object model to be pressed against the fixed object;

specifying a transfer start point of transfer of the reference line on the fixed object model; and transferring, starting from the transfer start point, the reference line onto the fixed object to create an operation path, and controlling the robot according to the operation path.

4. The robot programming method according to claim 3, wherein based on the reference line and the operation path, the robot operation program for moving the gripping object with the gripping object pressed against the fixed object is created.

* * * * *